March 12, 1968
J. Q. HOWEY
3,372,419
SPATULA SCRAPER
Filed Sept. 7, 1965
2 Sheets-Sheet 1
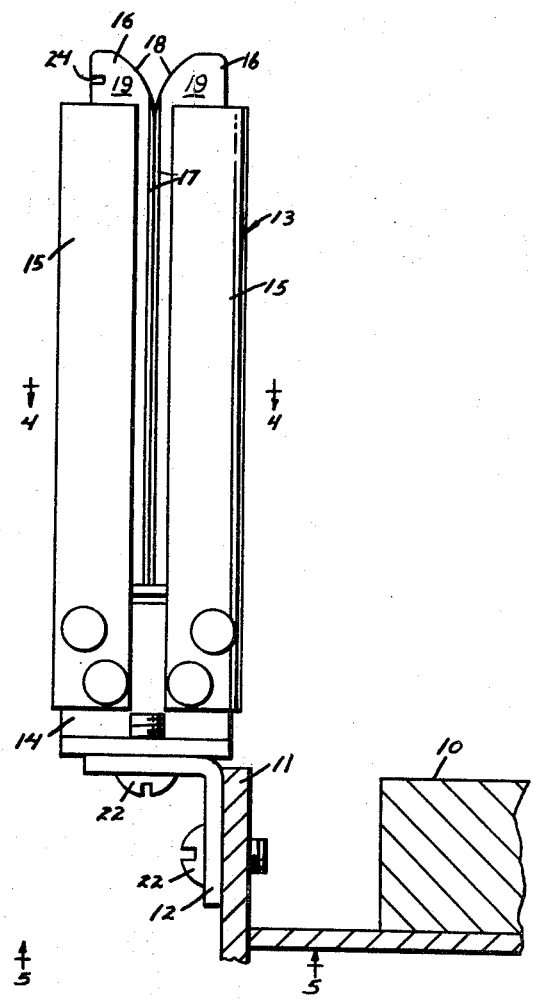
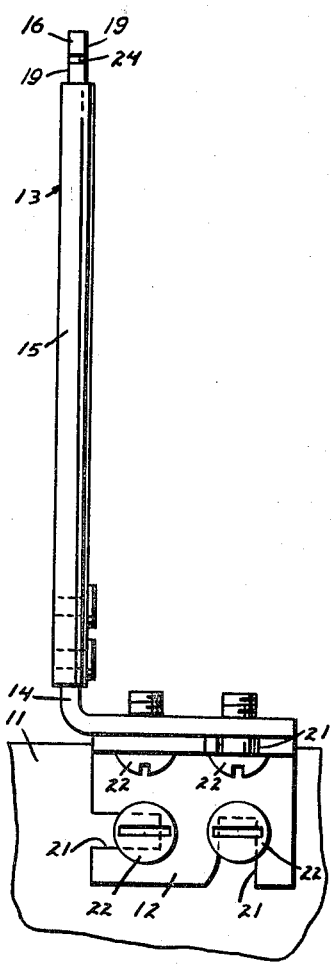
INVENTOR.
JESSE Q. HOWEY
BY *Wells & St.John*
ATTYS.

March 12, 1968  J. Q. HOWEY  3,372,419
SPATULA SCRAPER
Filed Sept. 7, 1965  2 Sheets-Sheet 2
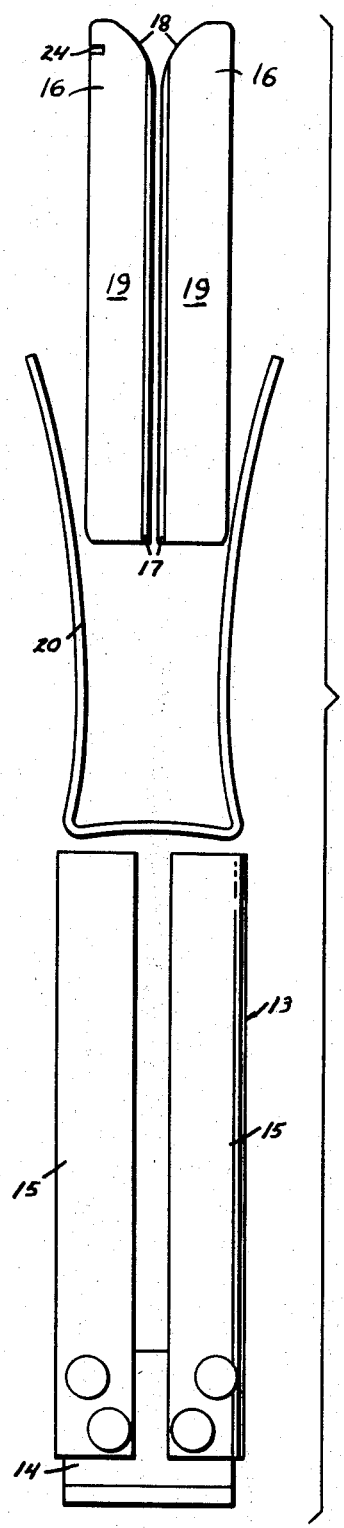
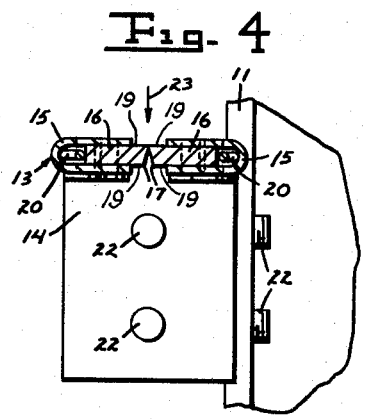
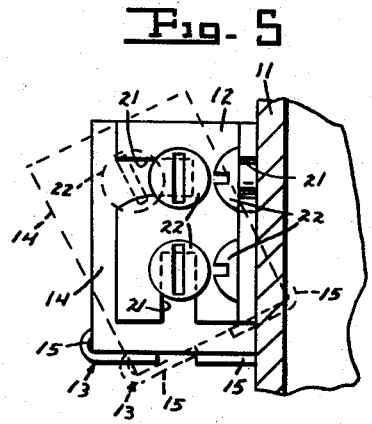
INVENTOR.
JESSE Q. HOWEY
ATTYS.

3,372,419
SPATULA SCRAPER
Jesse Q. Howey, P.O. Box 722, Missoula, Mont. 59801
Filed Sept. 7, 1965, Ser. No. 485,375
6 Claims. (Cl. 15—236)

ABSTRACT OF THE DISCLOSURE

A spatula cleaner to be mounted on a cooking grill. It includes a mounting bracket, a supporting rigid housing with an open elongated slot within which the spatula blade can be inserted, and two elongated rigid scraping blades which abut one another transversely. A compression spring is located between the housing and the blades to maintain them in yieldable abutment.

---

This invention relates to a novel scraper for cleaning spatulas.

Basically, the invention comprises an attachment for a grill or other suitable supporting member including yieldable blades between which a spatula can be inserted and pulled to scrape material from it. It is particularly designed for use by fry cooks, who have considerable difficulty in removing caked grease and food particles from spatulas.

It is a first object of this invention to provide a simple spatula scraper that can be produced with a reasonable amount of expense.

Another object of this invention is to provide such a scraper with easily replaceable blades for cleaning purposes and to accommodate contemplated wear.

Another object of this invention is to provide a scraper having sufficient strength to remove any removable material from a metal spatula without damaging the relatively thin blade.

These and further objects will be evident from the following disclosure, taken together with the accompanying drawings, which illustrate a preferred form of the invention. It is to be understood that this form of the invention is only exemplary and is not intended to limit the scope or extent of my invention.

In the drawings:

FIGURE 1 is a vertical sectional view taken alongside a scraper;

FIGURE 2 is a side elevation view of the scraper shown in FIGURE 1;

FIGURE 3 is an exploded view of the scraper assembly as seen in FIGURE 1;

FIGURE 4 is a sectional view taken along line 4—4 in FIGURE 1;

FIGURE 5 is a sectional view taken along line 5—5 in FIGURE 1 and illustrating an alternate position of the scraper housing in dashed lines.

Referring specifically to the drawings, the spatula scraper is illustrated as it would be mounted on a typical heated grill including a grill surface 10 and a surrounding peripheral wall 11. The scraper is secured to the wall 11 by a right angle bracket 12. The scraper itself generally comprises an elongated longitudinal housing 13 and a pair of elongated movable blades 16.

The housing 13 illustrated in the drawings is fabricated with an upright lower plate 14 that is relatively thin compared to its width and a pair of transversely spaced side members each having an inwardly open U-shaped transverse configuration. The members 15 are closed along their side edges and have a closed lower end due to the connection with plate 14. They have an open longitudinal outer end shown opposite to plate 14 at the top in the drawings and a longitudinal center slot formed between them in communication with their open outer ends.

Mounted between the members 15 are complementary blades 16 preferably made of hardened steel. Blades 16 transversely abut one another within the area defined by the center slot of housing 13. Blades 16 are relatively thin narrow blades having abutting tapered scraping edges 17 (FIGURE 4). Each blade has two parallel side faces 19 leading to the scraping edge 17 formed across them. The surfaces of scraping edges 17 converge in a direction opposite to the intended movement of a spatula between them. A spatula would be pulled between blades 16 in the direction indicated by arrow 23 in FIGURE 4.

Blades 16 are both frictionally held in place within housing 13 and biased transversely toward one another by a surrounding compression spring 20 that is bowed at each side for contact with the outer edges of the blades 16. The application of compressive force by spring 20 along each blade 16 is in a transverse direction parallel to the respective blade side faces 19. Spring 20 must be sufficiently strong to maintain the respective scraping edges 17 of blades 16 in direct metal to metal contact with a thin spatula blade being pulled between them. This same compressive force will normally retain blades 16 in place within housing 13, although the blades can be pulled outwardly from housing 13 by initial force applied with the aid of a slot 24 at the upper end of one blade 16. A spatula, knife, screw driver or other implement can be used to initially wedge the blade 16 outwardly and thereby free the blades for replacement or cleaning purposes.

To facilitate the positioning of a spatula between the edges 17, the top edges 18 of the respective blades 16 converge toward the edges 17 and serve as guiding members for a blade during its insertion.

The bracket 12 is provided with a pair of slots 21 that receive screws 22 on each of its surfaces. Each slot 21 is perpendicular to the other to permit bracket 12 to be revolved as illustrated in dashed lines in FIGURE 5. This permits easy removal of the scraper and bracket. By loosening screws 22, it is readily seen that turning of the bracket 12 will release the bracket from engagement with wall 11 and that turning of the bent plate 14 will release the housing 13 from engagement with the bracket 12. In normal use, the screws 22 serve to fixedly secure the housing 13 relative to the grill or other supporting member.

To clean a spatula one must simply pass the spatula blade between the abutting edges 17. The spatula can be easily inserted between the tapered edges 17, using the upper edges 18 as a guide. The tapered nature of the edges 17 reduces the friction encountered by the spatula during passage in a direction parallel to the edges 17. A spatula is inserted adjacent to its handle and then pulled in the direction indicated by arrow 23. Since the surface of edge 17 encountered by the spatula is perpendicular to the spatula movement there will be no force wedging the blades 16 outwardly in opposition to the force applied by the compressive spring 20. Material on the spatula will therefore be removed. One passage of a spatula between blades 16 is sufficient and this simple, convenient cleaning tool can be used any number of times a day without frequent cleaning. When cleaning is necessary, it can be readily dismantled as described above.

Many modifications could be made in the basic structure illustrated without deviating from the scope of this invention, therefore, only the following claims are intended to limit the extent of my invention.

Having thus described my invention, I claim:

1. A spatula scraper for attachment to a stationary supporting member, comprising:
an elongated longitudinal housing having an open outer end and a longitudinal slot formed therein in open communication with said outer end;

mounting means connected to said housing adapted to fixedly secure said housing to a supporting member;

a pair of opposed longitudinal rigid blades removably mounted in said housing in transverse abutting positions, each blade having parallel side faces leading to a longitudinal scraping edge formed across them, the width across the scraping edge of each blade being relatively narrow in comparison to the width of the side faces thereof, the respective side faces of the blades being substantially parallel to one another across said housing and the scraping edges of said blades being normally in abutting engagement with one another within the area defined by the slot of said housing, the abutting scraping edges of said blades being tapered oppositely to form converging edges directed oppositely to the intended movement of a spatula between them;

and biasing means operatively engaged between said housing and each of said blades to urge said blades transversely toward one another.

2. An apparatus as set out in claim 1 wherein said blades protrude longitudinally outward beyond the open outer end of said housing, the outer ends of the scraping edges of said blades being formed with complementary surfaces which converge transversely in a longitudinal direction toward the base of the slot to assist in directing a spatula between said blades.

3. An apparatus as set out in claim 1 wherein said housing is formed of two opposed and inwardly open U-shaped members transversely spaced across the slot formed therein, the individual blades being slidably received by the respective U-shaped members.

4. An apparatus as set out in claim 1 wherein said housing is formed of two opposed and inwardly open U-shaped members transversely spaced across the slot formed therein, the individual blades being slidably received by the respective U-shaped members;

said biasing means comprising a bent U-shaped spring located within the U-shaped members in abutment with the respective longitudinal outer edges of said blades and extending across the inner ends of said blades, said spring being bowed longitudinally at each side of said blades to form a yieldable biasing member.

5. An apparatus as set out in claim 1 wherein said biasing means comprises:

a bent U-shaped spring located between the longitudinal outer edge of each blade and said housing and extending across the inner ends of said blades, said spring being bowed longitudinally at each side of said blades to form a yieldable biasing member.

6. An apparatus as set out in claim 5 wherein the blades terminate longitudinally short of the base of the slot formed in the housing.

References Cited

UNITED STATES PATENTS

| 873,583 | 12/1907 | Nichols | 15—93 X |
|---|---|---|---|
| 2,707,299 | 5/1955 | Steindorf et al. | 15—236 |
| 2,839,772 | 6/1958 | Lambert | 15—236 |
| 2,861,288 | 11/1958 | Steindorf | 15—236 |
| 3,094,730 | 6/1963 | Schwarz | 15—218.1 |

FOREIGN PATENTS 532,889   11/1956   Canada.

CHARLES A. WILLMUTH, *Primary Examiner.*

L. G. MACHLIN, *Assistant Examiner.*